Aug. 20, 1957    W. A. CHRISTIANSON    2,803,199
RAILWAY VEHICLE STEERING MEANS
Filed Nov. 7, 1955    3 Sheets-Sheet 1

INVENTOR
Wallace A. Christianson
BY
J. C. Thorpe
ATTORNEY

Aug. 20, 1957  W. A. CHRISTIANSON  2,803,199
RAILWAY VEHICLE STEERING MEANS
Filed Nov. 7, 1955  3 Sheets-Sheet 2

Inventor
Wallace A. Christianson
By
J. E. Thorpe
Attorney

Aug. 20, 1957 W. A. CHRISTIANSON 2,803,199
RAILWAY VEHICLE STEERING MEANS
Filed Nov. 7, 1955 3 Sheets-Sheet 3

Inventor
Wallace A. Christianson
By
S. C. Thorpe
Attorney

2,803,199

RAILWAY VEHICLE STEERING MEANS

Wallace A. Christianson, Lisle, Ill., assignor to General Motors Corporation, Detroit, Mich., a corporation of Delaware Application November 7, 1955, Serial No. 545,311

8 Claims. (Cl. 105—3)

This invention relates generally to railway vehicles and more particularly to means for steering the wheels located at opposite ends of such vehicles.

With the increasing deficit in the operation of passenger trains there has been an increasing amount of pressure brought to bear by the railroads for manufacturers to provide lighter-weight, initial-low-cost cars. One of the methods proposed for making such cars lighter is to reduce the size of the trucks that support the bodies thereof. It has been proposed along these lines to in effect cut the truck in half, i. e., instead of having the usual four wheels and two axles per truck, to cut this number to a single axle and set of wheels at each end of the car. Such a proposal, however, raises serious problems of stability which appear most satisfactorily solved by stabilizing the truck so that it cannot turn relative to the end of the vehicle. By fixing the wheels and axles on opposite ends of the vehicle so that they cannot turn, however, substantially increases the span between wheel and axle sets which cannot turn relative to each other over the span obtained with pivoted truck assemblies using double wheel and axle sets. In certain installations, however, if the increase in span between non-turning wheel and axle sets is too great it will be attended by two main difficulties: First, a substantial increase in both wheel and wheel flange wear and in the rails on which they roll is caused. Second, and far more serious, is the fact that as the cars travel around a curve there is a much greater tendency because of the increased angle between the wheel and the rail for the wheels to tend to ride on their flanges over and off the rails.

To overcome the above defects created by too great a span between suspensions the present invention has been proposed which readily lends itself to use with the type of suspension deemed most satisfactory for these new lightweight trains and which actually steers the trucks to a slight degree so as to not only reduce the aforementioned undesirable rail and wheel wear but in the case of certain extremely long-span installations also acts to eliminate the far more serious danger of derailment of the vehicles.

It is therefore a primary object of the present invention to provide novel steering means for the trucks of railway vehicles.

It is a further primary object of this invention to in combination with a single wheel-and-axle-set-type truck assembly provide unique steering means therefor.

It is a further object of this invention to provide in combination with a single wheel-and-axle suspension a steering means which is sensitive to the relative angle between the vehicle and an adjoining vehicle to steer the assembly so that the vehicle will more smoothly and safely travel around curves.

For a fuller understanding of the above and other objects of the invention reference may be had to the accompanying detailed description and drawings, in which.

Figure 4:
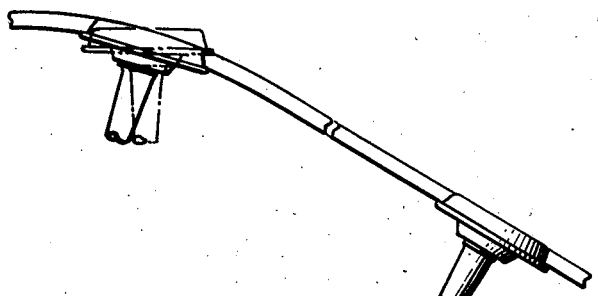

Figure 4 merely serves as an illustration somewhat exaggerated to indicate the need for steering the wheels.

Figure 1:
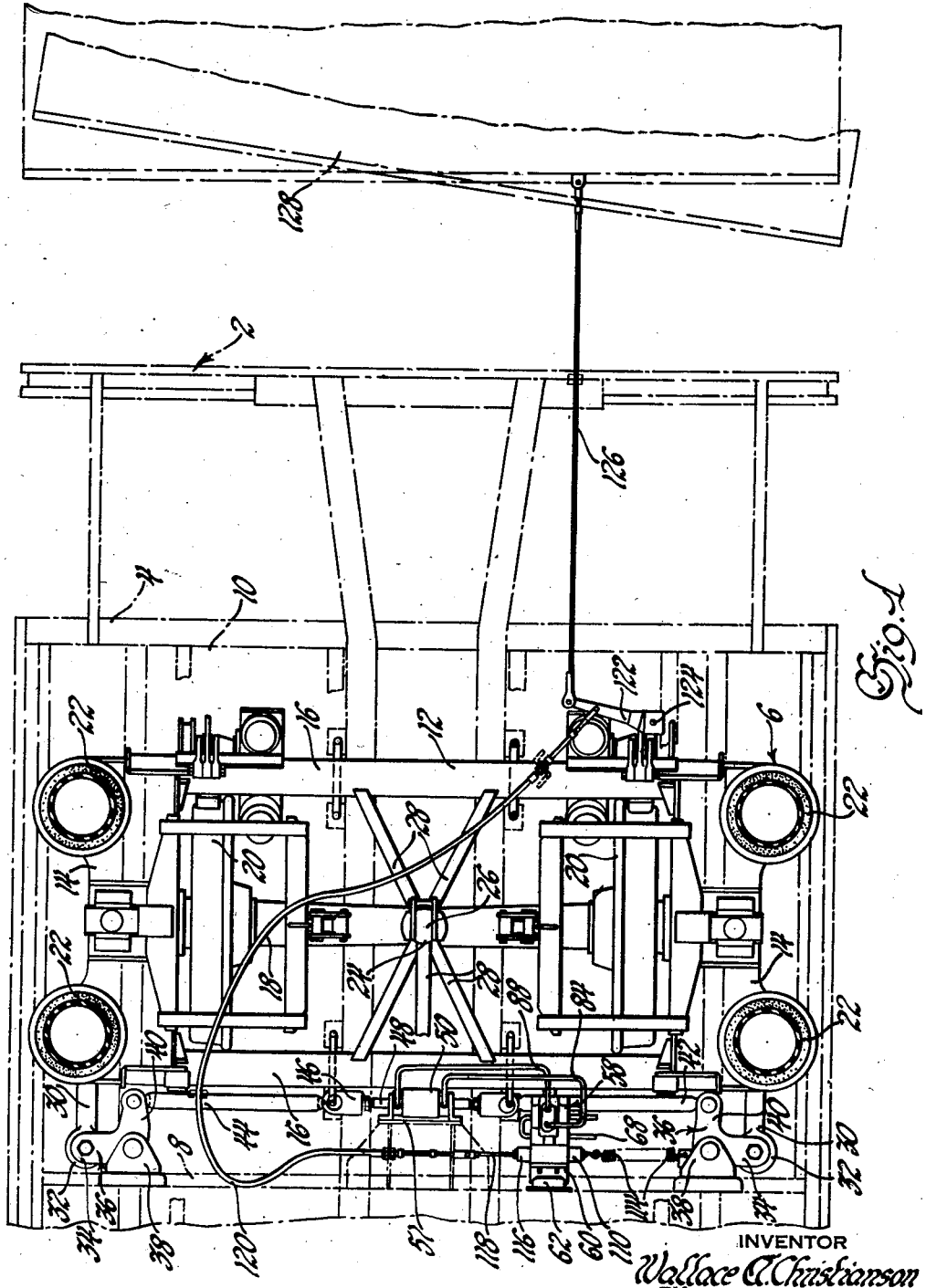
Figure 1 represents in detail a plan view of one end of a railway vehicle and the suspension therefor with the novel means for steering the suspension in response to the relative angle between the vehicle and an adjoining vehicle, also fragmentarily shown.
Figure 5:
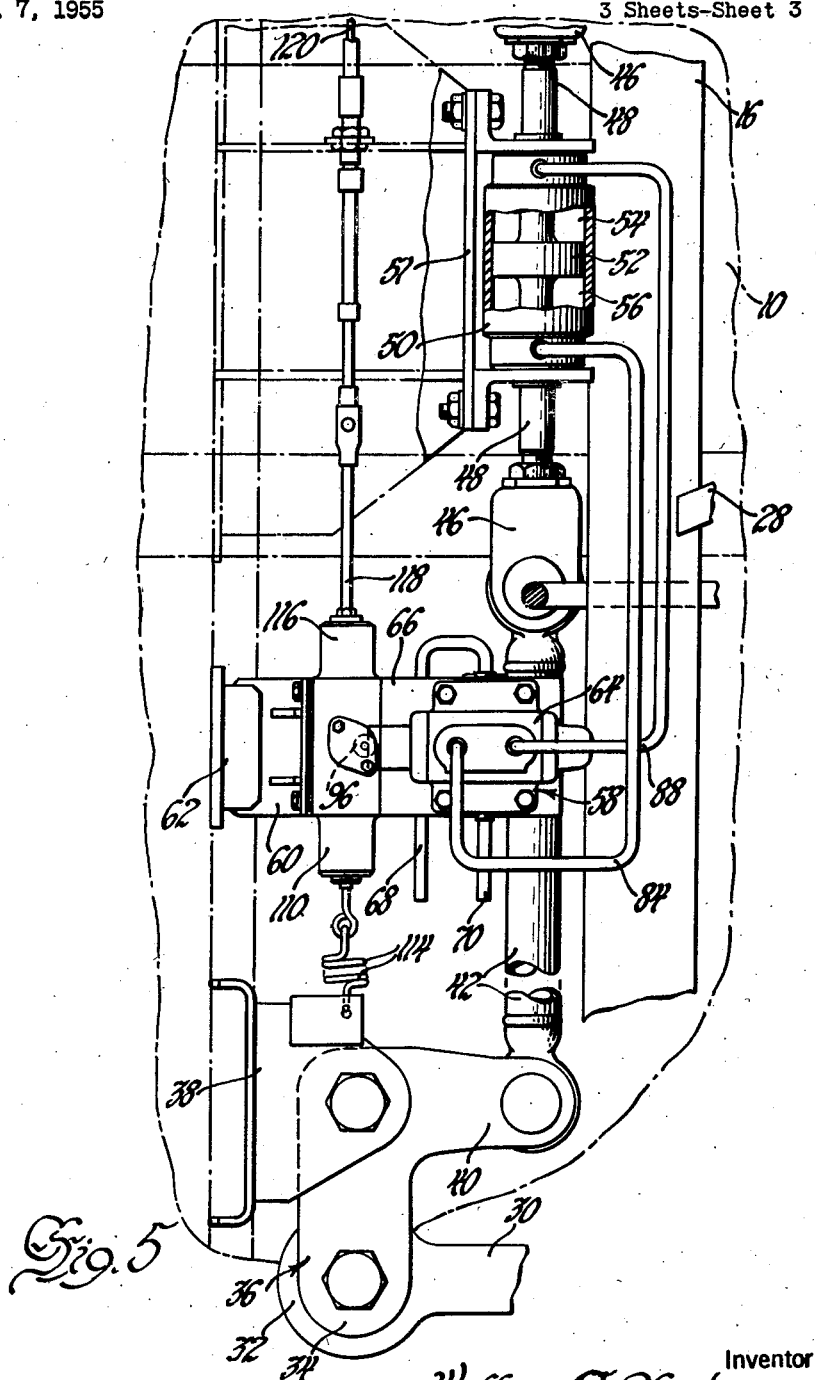

Figure 5 is an enlarged fragmentary view as shown in Figure 1.

Referring first to Figure 4, it will be observed that as the wheel travels around the curve on the rail because of the large span between the wheels and opposite ends of the car there is a tendency for the wheels to take the position shown in phantom. As will be readily observed, this not only has an adverse wearing effect on the rail, the wheel and the flange thereof but also tends to cause the car to become derailed. It is therefore considered extremely desirable, if possible, to have the wheels traveling around the curves take a position more nearly tangent to the curve as shown by the solid lines of Figure 4.

As previously explained, the invention although not necessarily limited thereto is particularly concerned with suspensions of the type particularly proposed for new lightweight cars, i. e., a suspension which utilizes a single wheel-and-axle set requiring certain stabilizing features. Such a suspension is shown in some detail in Figure 1. Referring first to that figure, the vehicle body, only a portion of which is shown and that in phantom, is indicated generally by a numeral 2 and the truck which is disposed below an end 4 of the body is indicated generally by a numeral 6. Secured to the end 4 and spaced some distance toward the center away from the extreme end of the underframe is a bulkhead 8. The bulkhead 8 in combination with the end 4 forms a more or less rectangular recess 10 in which the suspension is disposed. The suspension includes a truck frame 12 which is composed of a pair of laterally spaced, longitudinally extending wheel pieces 14 and a pair of longitudinally spaced, transversely extending tubular members 16 which are welded or otherwise suitably fixed to the wheel pieces 14 so as to form a substantially rigid rectangular frame. Each of the wheel pieces 14 includes a pair of longitudinally spaced, downwardly depending pedestal members between which is received the usual journal box assembly. The journal box assemblies act to rotatively journal opposite ends of a single axle 18 having pressed thereon the usual set of wheels 20. The truck 6, as previously mentioned, is disposed in the recess 10 and resiliently supports the end 4 by means of four air bellows 22 interposed between the underside of the end 4 and the upper sides of the wheel pieces 14.

From the foregoing description it will be appreciated that without more the truck frame and the end 4 of the vehicle can move laterally and vertically and longitudinally as well as rotatively with respect to each other because of the resiliency of the air bellows 22 provided between these two structures.

To provide stability for the truck assembly 6 so as to prevent it from moving longitudinally with respect to the end of the vehicle and also to prevent it from rotating relative to the end of the vehicle a plurality of radius rods have been provided between the frame 12 and the bulkhead 8. The first of these rods is indicated by numeral 24 and is pivotally connected by means of a resilient connection 26 directly to the frame 12 through a series of crosspieces 28 rigidly secured to the tubular members 16 adjacent the transverse center of the truck. The radius rod 24 has its opposite end pivotally fastened by a connection (not shown) to a bracket fixed to the upper structure of end 4 adjacent bulkhead 8.

To further stabilize the frame relative to the vehicle end 4 and also enable the frame to be turned relative to end 4, i. e., steered, a pair of radius rods 30 have been provided. Each rod 30 has an end more or less flexibly or pivotally connected to an associated wheel piece 14 and an opposite end 32 pivotally connected to a more or less transversely extending arm 34 of a bell crank 36 pivotally supported for horizontal movement by a bracket 38 fixed to the bulkhead 8. A second longitudinally extending arm 40 on each of the cranks 36 is connected to a rod or link 42 or 44, each in turn connected by means of a clevis assembly 46 to opposite ends of a rod assembly 48 forming a part of a fluid power cylinder assembly 50. The power cylinder assembly 50, which is fixed to bulkhead 8 by bracket 51, includes a power piston 52 (see Figure 5) fixed to rod 48 and adapted to move axially therewith. The cylinder of the assembly 50 is provided with chambers 54 and 56 on opposite sides of piston 52.

Fixed to the link or rod 42 for movement therewith is a valve assembly indicated generally by a number 58. This assembly, as indicated in Figures 1 and 2, is guided by a projection 60 received in a slotted bracket 62 fixed to the bulkhead 8.

Figure 2:
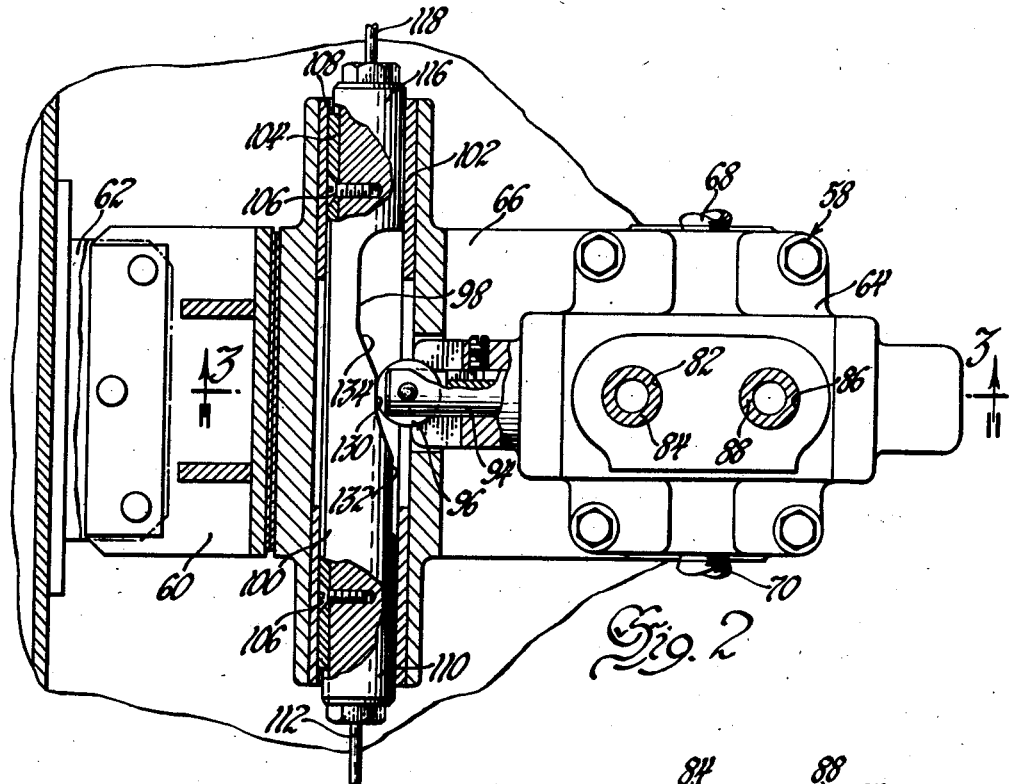
Figure 2 is an enlarged fragmentary view partially in section and with portions broken away to show the details of construction of the valve and valve-actuating means which control the supply and exhaust of fluid pressure to a power cylinder assembly which operates the mechanical portion of the steering mechanism.
Figure 3:
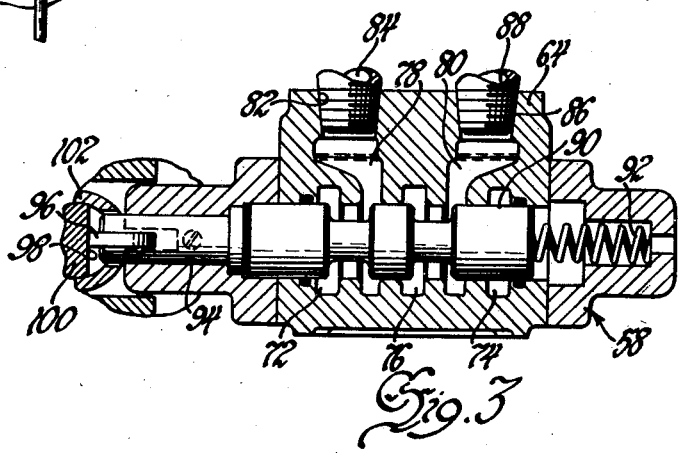
Figure 3 is a view in section taken on the line 3—3 of Figure 2 in order to more clearly illustrate how the valve controls the supply and exhaust pressure of the aforementioned power cylinder and also how the valve is actuated.

Details of the valve assembly 58 and portions of the actuating means (servomechanism) therefor are shown in Figures 2 and 3 and upon reference to those figures it will be observed include a valve housing 64 suitably mounted on a frame or chassis 66. The housing 64 is provided with an inlet port 68 which is utilized to supply pressure to the valve from a suitable pressure source and is further provided with an exhaust port 70 for exhausting pressure from the valve housing. Referring to Figure 3, the valve housing includes chambers 72 and 74 which are suitably and permanently connected to the exhaust port 70. Housing 64 also includes a chamber 76 which is permanently connected to the pressure port 68. The valve housing 64 is also provided with chambers 78 and 80 being connected via a port 82 and a conduit 84 (see Figure 1) to the chamber 56 of the power cylinder assembly 50, chamber 80 being connected by port 86 and a conduit 88 to chamber 54 of power cylinder 50. The valve housing 64 also includes a reciprocating piston valve 90 biased in one direction by a spring 92 and movable in the opposite direction by means of a rod 94 carrying a cam-following roller 96 rolling on a three-level cam surface 98 on a reciprocating cam 100. The cam 100 aside from the cam surface 98 formed therein is cylindrical in form and is adapted to move back and forth in a cylinder housing 102 fixed to the chassis 66. To prevent rotation of the cam 100 in the housing 102 a key 104 has been fixed thereto by studs 106 and key 104 is adapted to ride back and forth in a suitable slot 108 provided in bushings in the housing 102. An end 110 of the cam 100 is resiliently anchored by means of a small rod 112 and a helical coil spring 114 (see Figure 1) to bulkhead 8 by means of bracket 38. The opposite end 116 of cam 100 is anchored by means of a small rod 118 and a flexible cable 120 to a lever 122 pivotally fastened at 124 to the vehicle body, the lever 122 in turn having its free end secured by a cable 126 to the end of an adjoining vehicle shown in two positions in phantom and indicated by a numeral 128.

The operation of this unique steering means is as follows: Assume the vehicles 2 and 128 to be moving to the right as viewed in Figure 1 and that they are traveling about a curve to the right so as to cause the vehicle 128 to assume an angle relative to the vehicle 2 as shown in phantom. Under such conditions the cable 126 will move to the left as viewed in Figure 1 and lever 122 will pivot counterclockwise about the point 124 and cam 100 will move downwardly as viewed in the figure all due to the action of the biasing spring 114 acting to take up the slack occurring in cable 126. Movement of the cam 100 downward, as viewed in Figures 1 and 2, will cause the cam follower 96 because of the spring 92 to move to the lower level 134 of the cam surface 98 and the piston valve 90 to the left, as viewed in Figure 3, thereby connecting port 82 and conduit 94 to the exhaust chamber via the chamber 78. At the same time the pressure chamber 76 will be connected to chamber 80 so as to supply pressure via the port 86 and conduit 88 to the chamber 54 of the power cylinder 50 and against the upper side of the piston 52 so that rods 42 and 44 will cause the bell cranks 36 to rotate in a clockwise manner. Clockwise rotation of cranks 36 and arms 34 thereon will exert a pushing force on one side of the frame 12 and a pulling force on the opposite side which tends to pivot the frame relative to the end 4 about the connection 26. This will cause the frame to turn so that the wheels better conform to the curvature of the rails along which they are rolling. As the rod 42 moves down, as viewed in Figure 1, however, it carries the chassis 66 along with it causing the cam follower 96 to move along the cam surface 98 to the neutral level or position indicated by a numeral 130. When cam follower 96 moves to the level 130 piston valve 90 closes off chambers 78 and 80 from both pressure supply chamber 76 and the exhaust chambers 72 and 74 and the frame 12 will be held in its turned position by the pressure trapped in the chamber 54 of the power cylinder 50. As the curve straightens out so that the adjacent vehicles are again in alignment cable 126 will be pulled so as to cause lever 122 to pivot in a clockwise manner about point 124 and the cam 100 will be moved upwardly, as viewed in Figure 1, against the biasing action of spring 114 so that follower 96 rides up onto the upper level of cam surface 98 indicated by a numeral 132. This will cause the piston valve 90 to move to the right, as viewed in Figure 3, against biasing spring 92 so as to connect chamber 80 with exhaust chamber 74 and chamber 78 with pressure chamber 76. With chamber 80 connected to chamber 74 the pressure in chamber 54 of the power cylinder 50 will begin to exhaust via the conductor 88 and port 86 and at the same time pressure will be supplied to the chamber 56 of power cylinder 50 via the port 82 and conduit 84. Such changes in the pressures in chambers 54 and 56 will cause the rods 42 and 44 to move upwardly, as viewed in Figure 1. This upward movement of rods 42 and 44 will cause the bell cranks 36 to turn counterclockwise so as to straighten the frame relative to the vehicle. As rod 42 moves upwardly, however, it carries the chassis 66 on which the valve assembly 58 is mounted upwardly so that the follower 96 moves to the intermediate level 130. Due to the presence of spring 92 piston valve 90 will now begin to move to the left, as viewed in Figure 3, so that when the frame 12 is turned back so that it is again transverse of the end 4 the piston 90 will be in its centered position so as to trap equal pressures on opposite sides of the piston 52.

For a curve to the left the operation will be similar to that described above except that the actions will be reversed.

In actual practice one of these steering assemblies will be provided on each end of each vehicle and would be responsive to relative angle between the end of the vehicle with which it is associated and the adjacent end of an adjacent vehicle. The amount of turning needed of the frame 12 relative to the end 4 in actual practice is quite small due to the relatively large radius curvature of curves in the rails.

From the foregoing description it will be appreciated that a steering mechanism has been provided which is positively acted on at all times by fluid pressure so as to properly align the suspensions at opposite ends of vehicles when traveling along straight stretches of track but which is responsive to the relative angles between the adjoining vehicles caused by curved stretches of track to steer the truck to enable it to more smoothly and safely traverse such stretches of curved track.

What I claim is:

1. In combination with an end of a railway vehicle a suspension therefor comprising a transverse wheeled truck frame, resilient means interposed between said end and frame supporting said end on said frame, a longitudinally extending radius rod located transversely between the extremities of said frame and pivotally secured thereto and to the end of said vehicle, and means to turn said frame so that the wheels thereon align in a manner tending to conform to the curvature of the tracks along which they roll comprising a second longitudinally extending radius rod spaced from said first rod and adapted to be pivotally secured at one end thereof to said frame, a bell crank pivotally mounted on said vehicle end and having two arms one of which is connected to the opposite end of said second radius rod, and a servomechanism connected to the other arm of said crank and having means adapted to be connected to an adjacent vehicle coupled to said first-mentioned vehicle so as to be operable by the angularity between said vehicle and the adjacent vehicle caused by the curvature of said tracks.

2. In combination, a pair of adjoining railway vehicles coupled together, a suspension for one end of one of said vehicles comprising a wheeled truck frame, means supporting said end on said frame, a longitudinally extending radius rod pivotally connected between said end and said frame, and means for turning said frame relative to said end so that the wheels of said frame tend to conform to the curvature of the rails along which said vehicles move comprising a second longitudinally extending radius rod connected to said frame, a bell crank connected to said end, the end of said second radius rod being connected to one of the arms of said crank, a servomechanism mounted on said end, a link connecting said servomechanism to the other arm of said crank, and means sensitive to the angularity between the ends of said vehicles to actuate said servomechanism.

3. In a suspension for one end of a railway vehicle coupled to an adjoining vehicle, a truck frame and means for turning said frame relative to the vehicle to conform to the curvature of the tracks along which said vehicle moves comprising a pivotal connection between said frame and end, a member secured to said frame at a point transversely spaced from said connection, a bell crank pivotally mounted on said end and having an arm connected to said member and having another arm, and a servomechanism adapted to be connected to the adjacent vehicle so as to be responsive to the angularity between said end and the end of an adjoining vehicle caused by the curvature of the tracks along which said vehicles move connected to the other arm of said crank.

4. Steering means for a railway vehicle coupled to an adjoining vehicle including a truck and a body pivotally supported thereon comprising a bell crank pivotally supported on said body, means operably connecting one of the arms of said crank to said truck, and servomeans operatively connected to another arm of said crank and adapted to be connected to the adjoining vehicle to be operable in response to the relative angle between said vehicle and the adjoining vehicle.

5. Steering means for a railway vehicle coupled to an adjoining vehicle including a truck and a body pivotally supported thereon comprising a fluid-operated power cylinder and piston assembly on said body and operatively connected to said truck, and valve means adapted to be connected to the adjoining vehicle to be responsive to the relative angle between said vehicle and the adjoining vehicle to control the supply and exhaust of fluid to opposite sides of the piston of said assembly.

6. Steering means for a railway vehicle coupled to an adjoining vehicle including a truck and a body pivotally supported thereon comprising a bell crank pivotally supported on said body and a hydraulic power cylinder and piston assembly supported on said body, a longitudinally extending link connecting one of the arms of said crank and said truck, a second link connecting another of the arms of said crank and the piston of said assembly, valve means mounted on said second link for movement therewith operable to alternately supply pressure from a pressure source to opposite sides of the piston of said assembly and exhaust the pressure on opposite sides of the piston of said assembly, and valve-actuating means adapted to be connected to the adjoining vehicle to be responsive to the relative angle between said vehicle and the adjoining vehicle to control the supply and exhaust of hydraulic fluid to opposite sides of the piston of said assembly.

7. Steering means for a railway vehicle including a truck and a body pivotally supported thereon comprising a bell crank pivotally supported on said body and a hydraulic power cylinder and piston assembly supported on said body, a longitudinally extending link connecting one of the arms of said crank and said truck, a second link connecting another of the arms of said crank and the piston of said assembly, valve means mounted on said second link for movement therewith operable to alternately supply pressure from a pressure source to opposite sides of the piston of said assembly and exhaust the pressure on opposite sides of the piston of aid assembly, and valve-actuating means responsive to the relative angle between said vehicle and an adjoining vehicle to control the supply and exhaust of hydraulic fluid at opposite sides of the piston of said assembly comprising a three-level spring-biased cam operatively connected in opposition to the biasing thereof to an adjoining vehicle, a cam follower on said valve engageable with the levels of said cam the lower level of said cam corresponding to a turning of the truck of said vehicle in one direction the upper level of said cam corresponding to a turning of the truck of said vehicle in the opposite direction and intermediate level corresponding to a position wherein said truck is in alignment with the body of said vehicle.

8. Steering means for a railway vehicle coupled to an adjoining vehicle including a truck and a body pivotally supported thereon comprising a bell crank pivotally supported on said body, a hydraulic power cylinder and piston assembly supported on said body, means operatively connecting one of the arms of said crank to said truck and another arm thereof to the piston of said assembly, and hydraulic valve means adapted to be connected to the adjoining vehicle to be responsive to the relative angle between said vehicle and the adjoining vehicle to control the supply and exhaust of hydraulic fluid to opposite sides of the piston of said assembly.

References Cited in the file of this patent

UNITED STATES PATENTS 2,746,399   Tomas _____ May 22, 1956